United States Patent
Lee et al.

(10) Patent No.: US 8,530,085 B2
(45) Date of Patent: Sep. 10, 2013

(54) NEGATIVE ELECTRODE ACTIVE MATERIAL CONTAINING NANOMETAL PARTICLES AND SUPER-CONDUCTIVE NANOPARTICLES AND LITHIUM BATTERY COMPRISING THE NEGATIVE ELECTRODE ACTIVE MATERIAL

(75) Inventors: So-Ra Lee, Yongin-si (KR); Jae-Myung Kim, Yongin-si (KR); Kyu-Nam Joo, Yongin-si (KR); Sean Do, Yongin-si (KR); Jong-Hee Lee, Yongin-si (KR); Young-Su Kim, Yongin-si (KR); Deok-Hyun Kim, Yongin-si (KR); Gu-Hyun Chung, Yongin-si (KR); Beom-Kwon Kim, Yongin-si (KR); Yong-mi Yu, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 292 days.

(21) Appl. No.: 12/876,084

(22) Filed: Sep. 3, 2010

(65) Prior Publication Data

US 2011/0183202 A1  Jul. 28, 2011

(30) Foreign Application Priority Data

Jan. 28, 2010  (KR) .................. 10-2010-0008018

(51) Int. Cl.
*H01M 4/583*  (2010.01)
*H01M 4/60*   (2006.01)
*H01M 4/13*   (2010.01)

(52) U.S. Cl.
USPC ........... 429/212; 429/209; 429/210; 429/211; 429/213; 429/218.1; 429/223; 429/226; 429/231.8; 252/502; 252/503

(58) Field of Classification Search
USPC .................................... 429/209–255
See application file for complete search history.

(56) References Cited

U.S. PATENT DOCUMENTS

| | | |
|---|---|---|
| 7,094,499 B1 | 8/2006 | Hung |
| 2009/0117467 A1* | 5/2009 | Zhamu et al. ............ 429/231.8 |
| 2009/0269669 A1* | 10/2009 | Kim et al. ................ 429/231.8 |
| 2009/0305135 A1 | 12/2009 | Shi et al. |

FOREIGN PATENT DOCUMENTS

| | | |
|---|---|---|
| JP | 2009-535776 A | 10/2009 |
| JP | 2009-538813 | 11/2009 |
| KR | 10-2009-0058505 | 6/2009 |
| WO | WO2007/136164 A1 | 11/2007 |
| WO | WO2007/137795 | 12/2007 |
| WO | WO2009/061685 A1 | 5/2009 |

OTHER PUBLICATIONS

Extended European Search Report dated Apr. 23, 2012 for corresponding European Patent Application No. 10 194 487.4, 6pp.
Korean Registration Determination Certificate dated Mar. 27, 2012 for corresponding Korean Patent Application No. 10-2010-0008018, 5pp.

(Continued)

*Primary Examiner* — Milton I Cano
*Assistant Examiner* — Ling R Zeng
(74) *Attorney, Agent, or Firm* — Christie, Parker & Hale, LLP (57) ABSTRACT

A negative electrode active material including nanometal particles and super-conductive nanoparticles and a lithium battery including the same.

20 Claims, 9 Drawing Sheets

(56) References Cited

OTHER PUBLICATIONS

Japanese Office Action dated Oct. 30, 2012 of the corresponding Japanese Patent Application No. 2010-271549, 2 pages.
Extended European Search Report dated Apr. 28, 2011 for corresponding European Patent Application No. 10194487.4-1227, 7 pages.
Chou, et al., "Enhanced reversible lithium storage in a nanosize silicon/grapheme composite," Electrochemistry Communications, vol. 12 (2010) pp. 303-306.
Choucair, et al., "Gram-scale production of graphene based on solvothermal synthesis and sonication." Nature Nanotechnology, vol. 4, Jan. 2009, pp. 30-33.
KIPO Office Action dated Oct. 26, 2011 for priority document Korean Patent Application No. 10-2010-0008018, 4 pages.

* cited by examiner

NEGATIVE ELECTRODE ACTIVE MATERIAL CONTAINING NANOMETAL PARTICLES AND SUPER-CONDUCTIVE NANOPARTICLES AND LITHIUM BATTERY COMPRISING THE NEGATIVE ELECTRODE ACTIVE MATERIAL

CROSS-REFERENCE TO RELATED APPLICATION

This application claims priority to and the benefit of Korean Patent Application No. 10-2010-0008018, filed on Jan. 28, 2010, in the Korean Intellectual Property Office, the entire content of which is incorporated herein by reference.

BACKGROUND

1. Field

One or more embodiments of the present invention relate to a negative electrode active material including nanometal particles and super-conductive nanoparticles and a lithium battery including the negative electrode active material.

2. Description of the Related Art

Recently, lithium secondary batteries have drawn attention for use as power sources for portable, small electronic devices. As lithium secondary batteries use an organic electrolyte, the lithium secondary batteries have a discharge voltage that is twice or greater than that of conventional batteries using an aqueous alkali electrolyte, and thus have high energy density.

Lithium-transition metal oxides, such as $LiCoO_2$, $LiMn_2O_4$, $LiNi_{1-x}CO_xO_2$ (0<x<1), which have a structure that allows intercalation of lithium ions, are typically used as positive electrode active materials for lithium secondary batteries.

Carbonaceous materials in various forms, such as artificial graphite, natural graphite and hard carbon, which allow intercalation and deintercalation of lithium ions, and non-carbonaceous materials, such as silicon (Si), have been studied for use as negative electrode active materials. Such non-carbonaceous materials exhibit a very high capacity that is ten times or greater than that of graphite. However, the cycle lifetime characteristics thereof deteriorate due to volumetric expansion and shrinkage of the negative electrode active material during charging and discharging.

SUMMARY

An aspect of an embodiment of the present invention is directed toward a negative electrode active material having excellent capacity and lifetime characteristics.

An aspect of an embodiment of the present invention is directed toward a lithium battery including the negative electrode active material.

Additional aspects will be set forth in part in the description which follows and, in part, will be apparent from the description, or may be learned by practice of the presented embodiments.

According to one or more embodiments of the present invention, a negative electrode active material includes: nanometal particles and super-conductive nanoparticles, the super-conductive nanoparticles including n polycyclic nano-sheets, each of the n polycyclic nano-sheet including hexagonal rings, each of the hexagonal rings including 6 interconnected carbon atoms, each of the hexagonal rings being fused to at least another one of the hexagonal rings, the hexagonal rings of each of the polycyclic nano-sheets being arranged substantially in a plane, the n polycyclic nano-sheets being stacked in a direction normal to the plane, n being an integer in the range of 2 to 100, and each of the super-conductive nanoparticles having first and second carbon atoms respectively located in the n polycyclic nano-sheets, the first carbon atom being regarded as the origin A (0, 0, 0) of an x, y, z coordinate system, the second carbon atom having a coordinate B (a, b, c), a and b being each independently equal to or less than 10 μm, c being equal to or less than 100 nm, $L_1$ indicating a distance between the first and second carbon atoms, $L_2$ indicating a distance between a third carbon atom and a fourth carbon atom, the third carbon atom being selected from the carbon atoms of the n polycyclic nano-sheets except for the polycyclic nano-sheets having the first and the second carbon atoms, and the fourth carbon atom being selected from the carbon atoms of the n polycyclic nano-sheets except for the polycyclic nano-sheets having the first, second, and third carbon atoms.

The nanometal particle may include a material selected from the group consisting of silicon (Si), tin (Sn), nickel (Ni), and mixtures thereof.

The diameter of the nanometal particle may be in the range of about 1 to about 500 nm.

The adjacent bonded carbon atoms in each of the n polycyclic nano-sheets may be bonded to each other by $sp^2$ hybridized bonds.

Each of the n polycyclic nano-sheets may have a thickness equal to a diameter of one of the carbon atoms ±1 nm.

The value n may be an integer in the range of 2 to 10.

The coordinate c may have a value 50 times as large as the diameter of one of the carbon atoms ±10 nm.

The coordinate c may have a value in the range of about 0.1 nm to about 50 nm.

The coordinate c may have a value in the range of about 0.1 nm to about 20 nm.

The negative electrode active material may have a diameter in the range of about 3 μm to about 60 μm.

The negative electrode active material may be pitch-coated.

According to one or more embodiments of the present invention, a lithium battery includes: a positive electrode including a positive electrode active material; a negative electrode including a negative electrode active material including nanometal particles and super-conductive nanoparticles; and an electrolyte, each of the super-conductive nanoparticles including n polycyclic nano-sheets, each of the n polycyclic nano-sheets including hexagonal rings, each of the hexagonal rings including 6 interconnected carbon atoms, each of the hexagonal rings being fused to at least another one of the hexagonal rings, the hexagonal rings of each of the n polycyclic nano-sheets being arranged substantially in a plane, the n polycyclic nano-sheets being stacked in a direction normal to the plane, being an integer in the range of 2 to 100, and each of the super-conductive nanoparticles having first and second carbon atoms respectively located in the n polycyclic nano-sheets, the first carbon atom being regarded as the origin A (0, 0, 0) of an x, y, z coordinate system, the second carbon atom having a coordinate B (a, b, c), a and b being each independently equal to or less than 10 μm, c being equal to or less than 100 nm, $L_1$ indicating a distance between the first and second carbon atoms, $L_2$ indicating a distance between a third carbon atom and a fourth carbon atom, the third carbon atom being selected from the carbon atoms of the n polycyclic nano-sheets except for the polycyclic nano-sheets having the first and the second carbon atoms, and the fourth carbon atom being selected from the carbon atoms of the n polycyclic nano-sheets except for the polycyclic nano-sheets having the first, second, and third carbon atoms.

The nanometal particle may include a material selected from the group consisting of silicon (Si), tin (Sn), nickel (Ni), and mixtures thereof.

The diameter of the nanometal particle may be in the range of about 1 to about 500 nm.

Adjacent carbon atoms in each of the n polycyclic nano-sheets may be bonded to each other by $sp^2$ hybridized bonds.

Each of the n polycyclic nano-sheets may have a thickness equal to a diameter of one of the carbon atoms ±1 nm.

The value n may be an integer in the range of 2 to 10.

The coordinate c may have a value 50 times as large as the diameter of one of the carbon atoms ±10 nm.

The coordinate c may have a value in the range of about 0.1 nm to about 50 nm.

The coordinate c may have a value in the range of about 0.1 nm to about 20 nm.

The negative electrode active material may have a diameter in the range of about 3 μm to about 60 μm.

The negative electrode active material may be pitch-coated.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

In the following detailed description, only certain exemplary embodiments of the present invention are shown and described, by way of illustration. As those skilled in the art would recognize, the invention may be embodied in many different forms and should not be construed as being limited to the embodiments set forth herein. Also, in the context of the present application, when a first element is referred to as being "on" a second element, it can be directly on the second element or be indirectly on the second element with one or more intervening elements interposed therebetween. Like reference numerals designate like elements throughout the specification.

Although silicon (Si), tin (Sn), and nickel (Ni)-based active materials have high theoretical capacity, they cannot be applied to lithium batteries due to volume expansion of the negative electrode active material and precipitation of lithium (Li) during charging and discharging. Thus, in order to use these active materials having high theoretical capacity, there is a need for a method of preventing or reducing direct damage to lithium batteries that may occur when the volume of these active materials expands.

A negative electrode active material according to an embodiment of the present invention includes super-conductive nanoparticles coated with a high-capacity negative electrode material.

Figure 1:
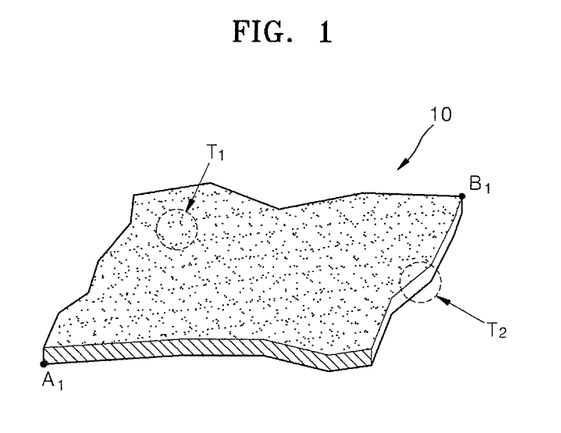
FIG. 1 schematically shows a super-conductive nanoparticle according to an embodiment of the present invention.

FIG. 1 schematically shows a super-conductive nanoparticle 10 according to an embodiment of the present invention. The super-conductive nanoparticle 10 may have an irregular shape, but generally has a substantially planar shape.

Although the super-conductive nanoparticle 10 may have a planar shape, it may also have various other suitable shapes, for example, a bent shape and a planar shape having one end rolled. The planar shape of the super-conductive nanoparticle 10 will be easily understood from the descriptions of the super-conductive nanoparticle 10 with reference to FIGS. 1 to 4, a SEM image of the super-conductive nanoparticle powder shown in FIG. 8A, and a TEM image of the super-conductive nanoparticles shown in FIG. 8B.

The super-conductive nanoparticle 10 includes n polycyclic nano-sheets, each of the n polycyclic nano-sheets including hexagonal rings, each of the hexagonal rings including 6 interconnected carbon atoms, the hexagonal rings being fused to another one of the hexagonal rings, the hexagonal rings of each of the n polycyclic nano-sheets being arranged substantially in a plane, and the n polycyclic nano-sheets being stacked in a direction normal to the plane.

Figure 2:
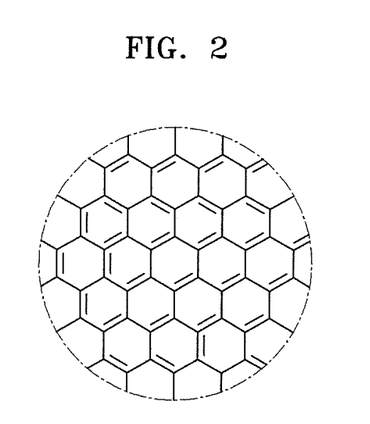
FIG. 2 schematically shows a molecular level enlarged diagram of a region $T_1$ delimited by a dotted circle in FIG. 1.

The wording "each of the hexagonal rings including 6 interconnected carbon atoms" used herein indicates hexagonal rings with carbon atoms located at the vertices of a hexagon. Hereinafter, the hexagonal ring refers to a 6-membered carbon ring. Each polycyclic nano-sheet includes a plurality of 6-membered carbon rings fused to each other to form a honeycomb structure arranged substantially in a plane. The wording "arranged substantially in a plane" indicates that a plurality of 6-membered carbon rings are fused to each other and extend in a single plane (e.g. the plurality of 6-membered carbon rings extend in a horizontal direction not in a vertical direction). The wording "hexagonal rings, each of the hexagonal rings including 6 interconnected carbon atoms, each of the hexagonal rings being fused to at least another one of the hexagonal rings, the hexagonal rings of each of the polycyclic nano-sheets being arranged substantially in a plane" may be easily understood with reference to FIG. 2 that schematically shows a molecular level enlarged diagram of a dotted circle shown as $T_1$ of FIG. 1. Referring to FIG. 2, the plurality of 6-membered carbon rings are fused to each other to form a honeycomb structure without space between the 6-membered carbon rings, and this honeycomb structure extends in a single plane (e.g. a horizontal direction). In FIG. 2, carbon atoms are located at the vertices of the 6-membered carbon ring.

Adjacent carbon atoms in the polycyclic nano-sheet may be bonded to each other by $sp^2$ hybridized bonds. Thus, a resonance structure may be formed in the 6-membered carbon ring so that movement of electrons through the polycyclic nano-sheet may be facilitated.

Since the polycyclic nano-sheet has a structure in which the plurality of 6-membered carbon rings are fused to each other and arranged in a plane, each of the n polycyclic nano-sheets may have a thickness equal to a diameter of one of the carbon atoms ±1 nm. In this regard, since the polycyclic nano-sheet has a thickness equal to the "diameter of the carbon atom ±1 nm", the polycyclic nano-sheet may be bent, one end of the polycyclic nano-sheet may be rolled, or the polycyclic nano-sheet may have crystallographic defects.

The super-conductive nanoparticle 10 has a structure including n polycyclic nano-sheets that are stacked as described above. In this regard, the n polycyclic nano-sheets are stacked in a direction normal to the plane in which the plurality of 6-membered carbon rings are fused to each other.

Figure 3:
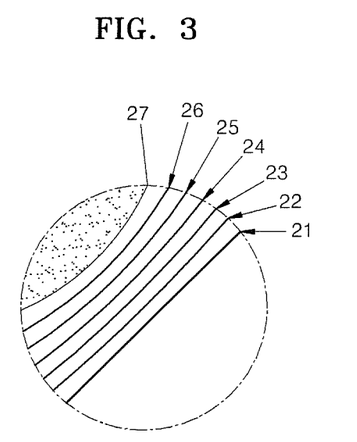
FIG. 3 schematically shows a molecular level enlarged diagram of a region $T_2$ delimited by a dotted circle in FIG. 1.

The structure as described above would be easily understood with reference to FIGS. 2 and 3. FIG. 2 schematically shows a molecular level enlarged diagram of a region $T_1$ delimited by a dotted circle in FIG. 1. FIG. 3 schematically shows a molecular level enlarged diagram of a region $T_2$ delimited by a dotted circle in FIG. 1. The n polycyclic nano-sheets may include a first polycyclic nano-sheet, a second polycyclic nano-sheet, a third polycyclic nano-sheet, . . . , an n–$2^{th}$ polycyclic nano-sheet, an n–$1^{th}$ polycyclic nano-sheet, and an n$^{th}$ polycyclic nano-sheet according to the stacked order. In the super-conductive nanoparticle 10 illustrated in FIG. 3, n is equal to 7. Referring to FIG. 3, the super-conductive nanoparticle 10 may have a structure including a first polycyclic nano-sheet 21, a second polycyclic nano-sheet 22, a third polycyclic nano-sheet 23, a fourth polycyclic nano-sheet 24, a fifth polycyclic nano-sheet 25, a sixth polycyclic nano-sheet 26, and a seventh polycyclic nano-sheet 27 which are stacked. In this embodiment (i.e. arrangement), the first polycyclic nano-sheet 21 to the seventh polycyclic nano-sheet 27 are stacked in a vertical direction normal to the plane in which the plurality of 6-membered carbon rings are fused to each other, and arranged as shown in FIG. 2.

Here, n may be an integer in the range of 2 to 100, for example 2 to 80, 2 to 70, 2 to 40, 2 to 20, or 2 to 10.

In one embodiment, each of the super-conductive nanoparticles 10 has first and second carbon atoms respectively located in the n polycyclic nano-sheets, the first carbon atom being regarded as the origin A (0, 0, 0) of an x, y, z coordinate system, the second carbon atom being a coordinate B (a, b, c), a and b being each independently equal to or less than 10 μm, and c being equal to or less than 100 nm. A distance $L_1$ may be greater than or equal to a distance $L_2$. Here, $L_1$ indicates a distance between the first and second carbon atoms, and $L_2$ indicates a distance between a third carbon atom that is selected from the carbon atoms of the n polycyclic nano-sheets except for the polycyclic nano-sheets having the first and the second carbon atoms and a fourth carbon atom that is selected from the carbon atoms of the n polycyclic nano-sheets except for the polycyclic nano-sheets having the first, second, and third carbon atoms. That is, the first and second carbon atoms are selected from the carbon atoms of the polycyclic nano-sheets such that the distance between the first and second carbon atoms is the longest.

Figure 4:
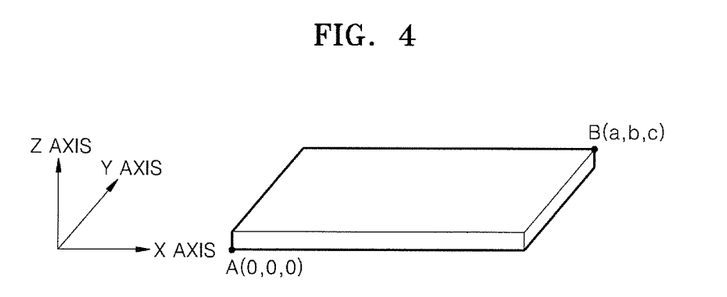
FIG. 4 shows a virtual polyhedron (e.g. a cube or cuboid) having a maximum distance between coordinates A and B, where a first carbon atom located at $A_1$ in FIG. 1 is regarded as the origin A (0, 0, 0) of an x, y, z coordinate system, and a second carbon atom located at $B_1$ in FIG. 1 is regarded as a coordinate B (a, b, c).

For example, the first carbon atom of the super-conductive nanoparticle 10 of FIG. 1 may be located at the $A_1$ position, and the second carbon atom may be located at the $B_1$ position. Referring to FIG. 4, if the first carbon atom located at $A_1$ of FIG. 1 is regarded as the origin A (0, 0, 0) of an x, y, z coordinate system, the second carbon atom located at $B_1$ of FIG. 1 is regarded as a coordinate B (a, b, c). For descriptive convenience, a virtual polyhedron (e.g. a cube or a cuboid) having a maximum length between coordinates A and B is also shown. Accordingly, "a", "b", and "c" respectively correspond to a width, a length, and a height of a virtual polyhedron shown in FIG. 4. Thus, "a", "b", and "c" may be regarded as a width, a length, and a height of the virtual polyhedron that is densely filled with the n polycyclic nano-sheets of FIG. 1.

Coordinates a and b may be each independently equal to or less than 10 μm, for example, a and b may be in the range of about 1 to about 10 μm.

Coordinate c may be 50 times as large as the diameter of the carbon atom ±10 nm. Here, "50 times as large as the diameter of the carbon atom" indicates that the super-conductive nanoparticle 10 may include up to 50 polycyclic nano-sheets, and "±10 nm" indicates that the polycyclic nano-sheets may be bent, one end of the polycyclic nano-sheets may be rolled, or the polycyclic nanosheets may contain crystallographic defects.

Coordinate c may be equal to or less than 100 nm, for example, c may range from about 0.1 to about 100 nm, about 0.1 to about 90 nm, about 0.1 to about 50 nm, or about 0.1 to about 20 nm.

Since a, b, and c of the super-conductive nanoparticle 10 are within the range described above, a lithium battery including the negative electrode active material according to the current embodiment has excellent capacity and lifetime characteristics, but the present invention is not limited thereto.

Super-conductive nanoparticle powder includes a plurality of individual super-conductive nanoparticles. Each of the super-conductive nanoparticles contained in the super-conductive nanoparticle powder is defined as described above.

The plurality of super-conductive nanoparticles contained in the super-conductive nanoparticle powder may have different shapes and sizes. Thus, the super-conductive nanoparticle powder may be defined according to the descriptions of the super-conductive nanoparticles above and the size distribution of the super-conductive nanoparticles contained in the super-conductive nanoparticle powder. For example, the super-conductive nanoparticle powder may have "a", "b", and "c" which are defined with respect to each of the super-conductive nanoparticles, wherein a, b, and c may be defined as $d_{50}$ thereof. The definition of $d_{50}$ is apparent to those of skill in that art.

For example, $d_{50}$ of a and b of the super-conductive nanoparticles may be each independently equal to or less than 10 μm, for example, $d_{50}$ may be in the range of about 1 to about 10 μm.

Here, $d_{50}$ of c of the super-conductive nanoparticle powder may be 50 times as large as the diameter of the carbon atom ±10 nm. In this case, the "50 times as large as the diameter of the carbon atom" indicates that each of the super-conductive nanoparticles contained in the super-conductive nanoparticle powder may include up to 50 polycyclic nano-sheets, and "±10 nm" indicates that each of the polycyclic nano-sheets contained in the super-conductive nanoparticle powder may be bent, one end of each polycyclic nano-sheet may be rolled, or each polycyclic nano-sheet may contain crystallographic defects.

The $d_{50}$ of c of the super-conductive nanoparticle powder may be equal to or less than 100 nm, for example, $d_{50}$ may be in the range of about 0.1 to about 100 nm, about 0.1 to about 90 nm, about 0.1 to about 50 nm, or about 0.1 to 20 nm, but is not limited thereto.

The super-conductive nanoparticle powder may be prepared using graphite as a starting material. A method of preparing the super-conductive nanoparticle powder may include swelling graphite, adding a solvent to the swollen graphite, pulverizing the swollen graphite in the solvent, and removing the solvent from the pulverized powder. This will now be described in further detail.

First, graphite is swollen by heat-treatment, and gas generated therefrom is removed. Here, expanded graphite may also be used as a starting material, but the present embodiment is not limited thereto. The temperature for swelling the graphite may be in the range of about 400 to about 600° C., and the heat-treatment may be performed for about 30 minutes to about 2 hours, but the present embodiment is not limited thereto. If the temperature and time for the heat-treatment is within the range described above, the graphite may be swollen enough to obtain super-conductive nanoparticle powder having "c" or "$d_{50}$ of c" satisfying the ranges described above without substantial damage to the carbon-carbon bonds.

Gas generated while the graphite swells may be removed. The gas generated may be an oxide formed by binding impurities contained in graphite, e.g., atoms and molecules other than carbon, to oxygen, or the like. For example, the gas may be $SO_2$, but is not limited thereto. Since impurities contained in the graphite may be removed by calcination during the swelling of the graphite, purity of the super-conductive nanoparticle powder may be improved.

A solvent is then added to the swollen graphite, and the swollen graphite in the solvent is pulverized. Any suitable solvent that does not substantially react with the swollen graphite but provides flowability may be used. The solvent may be an alcohol, e.g., ethanol, but is not limited thereto.

Then, the swollen graphite is pulverized in the solvent as described above. The swollen graphite may be pulverized using various suitable methods, for example, using a homogenizer or a micro fluidizer. The pulverization process may be repeated several times, for example, twice or more, using different methods. Meanwhile, the swollen graphite may be mixed with any suitable acid before pulverizing the swollen graphite, or any other suitable modifications may be made. For example, a and/or b of the super-conductive nanoparticle may be controlled according to the number of time the pulverization process is carried out using a micro fluidizer, but is not limited thereto.

Then, the solvent is removed to obtain the super-conductive nanoparticle powder. The solvent may be removed using various suitable methods, which may be selected according to the physical properties of the solvent, such as boiling point. For example, the pulverized resultant may be filtered, washed, and heat-treated at 80° C.

A nanometal particle contained in a negative electrode active material according to an embodiment of the present invention may be a material selected from the group consisting of silicon (Si), tin (Sn), nickel (Ni), and any mixture thereof. The diameter of the nanometal particle may be in the range of about 1 to about 500 nm.

If the diameter of the nanometal particle is within the range described above, the destruction of the negative electrode active material due to volumetric expansion caused by Si during charging and discharging may be efficiently reduced.

The diameter of the negative electrode active material including the nanometal particles and the super-conductive nanoparticles may be in the range of about 3 to about 60 μm.

If the diameter of the negative electrode active material is within the range described above, the ultimate specific surface area according to one embodiment is in the range of about 3 to about 20 $m^2/g$ which is suitable for making slurry and treatment. Thus, the formation of a solid electrolyte interface (SEI) on the surface may efficiently be controlled.

According to another embodiment of the present invention, the surface of the negative electrode active material may be pitch-coated.

A lithium battery according to another embodiment of the present invention includes: a positive electrode including a positive electrode active material; a negative electrode including a negative electrode active material including nanometal particles and super-conductive nanoparticles; and an electrolyte.

The positive electrode may include a current collector and a positive electrode active material layer formed on the current collector. A compound (lithiated intercalation compound), which allows reversible intercalation and deintercalation of lithium, may be used as the positive electrode active material contained in the positive electrode. Examples of the positive electrode active material may include compounds represented by the following formulae.

$Li_aA_{1-b}X_bD_2$ (where $0.95 \leq a \leq 1.1$, and $0 \leq b \leq 0.5$); $Li_aE_{1-b}X_bO_{2-c}D_c$ (where $0.95 \leq a \leq 1.1$, $0 \leq b \leq 0.5$, and $0 \leq c \leq 0.05$); $LiE_{2-b}X_bO_{4-c}D_c$ (where $0 \leq b \leq 0.5$ and $0 \leq c \leq 0.05$); $Li_aNi_{1-b-c}Co_bB_cD_\alpha$ (where $0.95 \leq a \leq 1.1$, $0 \leq b \leq 0.5$, $0 \leq c \leq 0.05$, and $0 < \alpha \leq 2$); $Li_aNi_{1-b-c}Co_bX_cO_{2-\alpha}M_\alpha$ (where $0.95 \leq a \leq 1.1$, $0 \leq b \leq 0.5$, $0 \leq c \leq 0.05$, and $0 < \alpha < 2$); $Li_aNi_{1-b-c}Co_bX_cO_{2-\alpha}M_2$ (where $0.95 \leq a \leq 1.1$, $0 \leq b \leq 0.5$, $0 \leq c \leq 0.05$, and $0 < \alpha < 2$); $Li_aNi_{1-b-c}Mn_bX_cD_{2-\alpha}$ (where $0.95 \leq a \leq 1.1$, $0 \leq b \leq 0.5$, $0 \leq c \leq 0.05$, and $0 < \alpha < 2$); $Li_aNi_{1-b-c}Mn_bX_cO_{2-\alpha}M_\alpha$ (where $0.95 \leq a \leq 1.1$, $0 \leq b \leq 0.5$, $0 \leq c \leq 0.05$, and $0 < \alpha < 2$); $Li_aNi_{1-b-c}Mn_bX_cO_{2-\alpha}M_2$ (where $0.95 \leq a \leq 51.1$, $0 \leq b \leq 0.5$, $0 \leq c \leq 0.05$, and $0 < \alpha < 2$); $Li_aNi_bE_cG_dO_2$ (where $0.90 \leq a \leq 1.1$, $0 \leq b \leq 0.9$, $0 \leq c \leq 0.5$, and $0.001 \leq d \leq 0.1$); $Li_aNi_bCo_cMn_dG_eO_2$ (where $0.90 \leq a \leq 1.1$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1.1$ and $0.001 \leq b \leq 50.1$); $Li_aCoG_bO_2$ (where $0.90 \leq a \leq 1.1$ and $0.001 \leq b \leq 0.1$); $Li_aMnG_bO_2$ (where $0.90 \leq a \leq 1.1$ and $0.001 \leq b \leq 0.1$); $Li_aMn_2G_bO_4$ (where $0.90 \leq a \leq 1.1$ and $0.001 \leq b \leq 0.1$); $QO_2$; $QS_2$; $LiQS_2$; $V_2O_5$; $LiV_2O_5$; $LiZO_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); $LiFePO_4$; and lithium titanate.

In the formulae, A is selected from the group consisting of nickel (Ni), cobalt (Co), manganese (Mn), and combinations thereof; X is selected from the group consisting of aluminum (Al), nickel (Ni), cobalt (Co), manganese (Mn), chromium (Cr), iron (Fe), magnesium (Mg), strontium (Sr), vanadium (V), a rare earth element, and combinations thereof; D is selected from the group consisting of oxygen (O), fluorine (F), sulfur (S), phosphorus (P), and combinations thereof; E is selected from the group consisting of cobalt (Co), manganese (Mn), and combinations thereof; M is selected from the group consisting of fluorine (F), sulfur (S), phosphorus (P), and combinations thereof; G is selected from the group consisting of aluminum (Al), chromium (Cr), manganese (Mn), iron (Fe), magnesium (Mg), lanthanum (La), cerium (Ce), strontium (Sr), vanadium (V), and combinations thereof; Q is selected from the group consisting of titanium (Ti), molybdenum (Mo), manganese (Mn), and combinations thereof; Z is selected from the group consisting of chromium (Cr), vanadium (V), iron (Fe), scandium (Sc), yttrium (Y), and combinations thereof; and J is selected from the group consisting of vanadium (V), chromium (Cr), manganese (Mn), cobalt (Co), nickel (Ni), copper (Co), and combinations thereof.

For example, the positive electrode active material may be lithium titanate.

The lithium titanate may include a spinel-type lithium titanate, an anatase-type lithium titanate, and a ramsdellite-type lithium titanate based on the crystalline structure.

The positive electrode active material may be represented by the formula $Li_{4-x}Ti_5O_{12}$ ($0 \leq x \leq 3$).

For example, the positive electrode active material may be $Li_4Ti_5O_{12}$, but is not limited thereto.

Alternatively, the positive electrode active material may be $Li_aNi_bCO_cMn_dG_eO_2$ (where $0.90 \leq a \leq 1.1$, $0 \leq b \leq 0.9$, $0 \leq c \leq 0.5$, $0 \leq d \leq 0.5$, e=0, for example, a=1, b=0.5, c=0.2, d=0.3, e=0), $LiMn_2O_4$, or the like, but is not limited thereto.

Also, a lithium electrode may be used as the positive electrode, which may be referred to as a half cell.

The above compounds may have a surface coating layer. Alternatively, a mixture of a compound not having a coating layer and a compound having a coating layer, the compounds being selected from the above group, may be used. The coating layer may include a compound of a coating element selected from the group consisting of oxides, hydroxides, oxyhydroxides, oxycarbonates, and hydroxycarbonates of the coating element. The compounds for the coating layer may be amorphous or crystalline. The coating element contained in the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or one or more mixtures thereof.

The coating layer may be formed using any suitable method, for example, a spray coating method, a dipping method, or the like, which does not adversely affect the physical properties of the positive electrode active material when a compound of such a coating element is used. This is apparent to those of skill in the art, and thus a detailed description thereof will not be provided.

The positive electrode active material layer may further include a binder.

The binder contained in the positive electrode active material layer functions to strongly bind positive electrode active material particles together and to the current collector. Examples of the binder may include, polyvinyl alcohol, carboxymethyl cellulose, hydroxypropyl cellulose, diacetyl cellulose, polyvinyl chloride, carboxylated polyvinyl chloride, polyvinyl fluoride, and a polymer having ethylene oxide, polyvinylpyrrolidone, polyurethane, polytetrafluoroethylene, polyvinylidene fluoride, polyethylene, polypropylene, styrene-butadiene rubber (SBR), acrylated SBR, epoxy resin, nylon, and the like, but are not limited thereto.

Al may be used as the current collector, but is not limited thereto.

The positive electrode is manufactured by mixing the positive electrode active material and the binder (and may optionally include a conducting agent) in a solvent to prepare a positive electrode active material composition and by coating the positive electrode active material composition on the current collector. The method of manufacturing the positive electrode is obvious to those of ordinary skill in the art, and thus a detailed description thereof will not be provided. The solvent may be N-methylpyrrolidone, or the like, but is not limited thereto.

Figure 6:
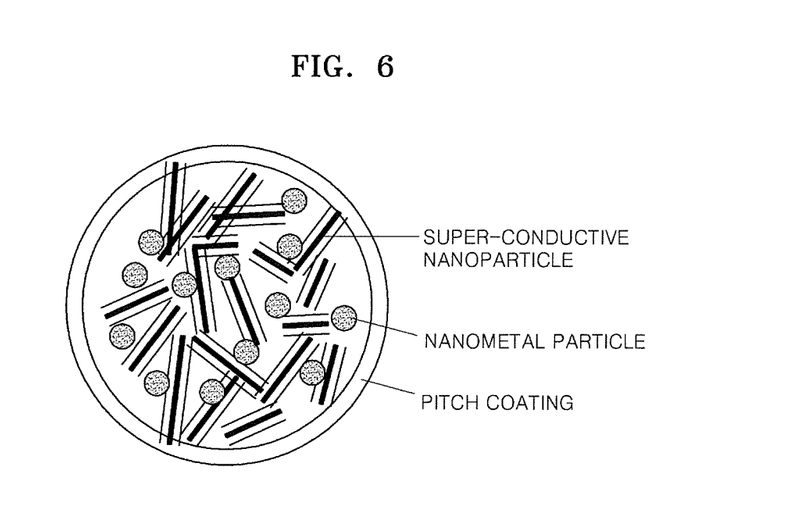
FIG. 6 schematically shows a cross-sectional view of a negative electrode active material according to an embodiment of the present invention.

FIG. 6 schematically shows a cross-sectional view of a negative electrode active material according to an embodiment of the present invention.

Referring to FIG. 6, the negative electrode active material may include nanometal particles and super-conductive nanoparticles, the types and sizes of which are described above.

The negative electrode active material may have a diameter in the range of about 3 μm to about 60 μm, and the surface of the negative electrode active material may be pitch-coated.

Figure 7:
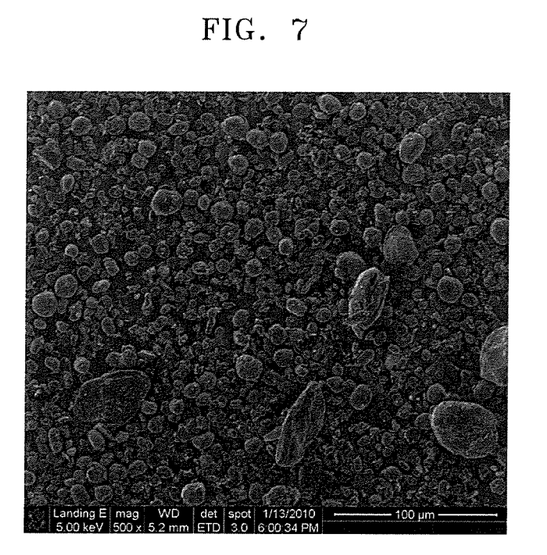
FIG. 7 is an enlarged scanning electron microscope (SEM) image of a spherical negative electrode active material according to an embodiment of the present invention.

FIG. 7 is an enlarged scanning electron microscope (SEM) image of a spherical negative electrode active material according to an embodiment of the present invention.

The negative electrode active material may further include a binder and a solvent that is the same as that of the positive electrode active material, described above.

In addition, the negative electrode active material may include a material selected from the group consisting of carbon black, ketjen black, acetylene black, artificial graphite, natural graphite, copper powder, nickel powder, aluminum powder, and polyphenylene, as a conducting agent.

A plasticizer may be added to the positive electrode active material composition and the negative electrode active material composition to produce pores inside the electrode plates.

The electrolyte may include a nonaqueous organic solvent and a lithium salt.

The nonaqueous organic solvent may serve as a medium for the movement of ions associated with electrochemical reactions in lithium batteries. The nonaqueous organic solvent may include a carbonate solvent, an ester solvent, an ether solvent, a ketone solvent, an alcohol solvent, or an aprotic solvent. Examples of the carbonate solvent available as the nonaqueous organic solvent may include dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), and the like. Examples of the ester solvent may include methyl acetate, ethyl acetate, n-propyl acetate, dimethyl acetate, methyl propionate, ethyl propionate, γ-butyrrolactone, decanolide, valerolactone, mevalonolactone, caprolactone, and the like. Examples of the ether solvent available as the nonaqueous organic solvent may include dibutyl ether, tetraglyme, diglyme, dimethoxyethane, 2-methyltetrahydrofuran, tetrahydrofuran, and the like. Examples of the ketone solvent available as the nonaqueous organic solvent may include cyclohexanone, and the like. Examples of the alcohol solvent available as the nonaqueous organic solvent may include ethyl alcohol, isopropyl alcohol, and the like. Examples of the aprotic solvent may include nitrils, such as R—CN (where R is a straight, branched or cyclic C2-C20 hydrocarbon group, which may have a double-bonded aromatic ring or an ether bond); amides, such as dimethylformamide; dioxolanes, such as 1,3-dioxolane; sulfolanes, and the like.

The nonaqueous organic solvent may be used alone. Alternatively, at least two of the nonaqueous organic solvents may be used in combination. In this case, a mixing ratio of the at least two of the nonaqueous organic solvents may appropriately vary according to the performance of the lithium battery, which is obvious to those of ordinary skill in the art.

The lithium salt contained in the electrolytic solution is dissolved in the organic solvent and provides lithium ions for the lithium battery to operate and facilitates the migration of lithium ions between the positive electrode and the negative electrode. The lithium salt may include a supporting electrolyte salt selected from the group consisting of $LiPF_6$, $LiBF_4$, $LiSbF_6$, $LiAsF_6$, $LiN(SO_2C_2F_6)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$, where x and y are natural numbers, LiCl, LiI and $LiB(C_2O_4)_2$, and lithium bis(oxalato) borate (LiBOB). The concentration of the lithium salt may be in the range of about 0.1 to about 2.0 M. If the concentration of the lithium salt is within the above range, the electrolyte may have a suitable conductivity and viscosity, and thus may exhibit excellent performance, allowing lithium ions to effectively migrate.

A separator may be between the positive electrode and the negative electrode according to the type of the lithium battery. The separator may be a monolayer, or the separator may be a multilayer including at least two layers formed of polyethylene, polypropylene, and/or polyvinylidene fluoride. The multilayer may be a mixed multilayer. For example, the separator may be a two-layered separator including polyethylene and polypropylene layers, a three-layered separator including polyethylene, polypropylene and polyethylene layers, a three-layered separator including polypropylene, polyethylene and polypropylene layers.

Lithium batteries may be classified as lithium ion batteries, lithium ion polymer batteries or lithium polymer batteries according to the types of separator and electrolyte. In addition, a lithium battery may be classified as a cylindrical type, a rectangular type, a coin type, or a pouch type according to the shape of the battery; and may be also classified as a bulk type or a thin film type according to the size of battery. The lithium batteries may be configured as a primary battery or a secondary battery. Methods of manufacturing these batteries are known in the field, and detailed descriptions thereof will not be repeated.

Figure 5:
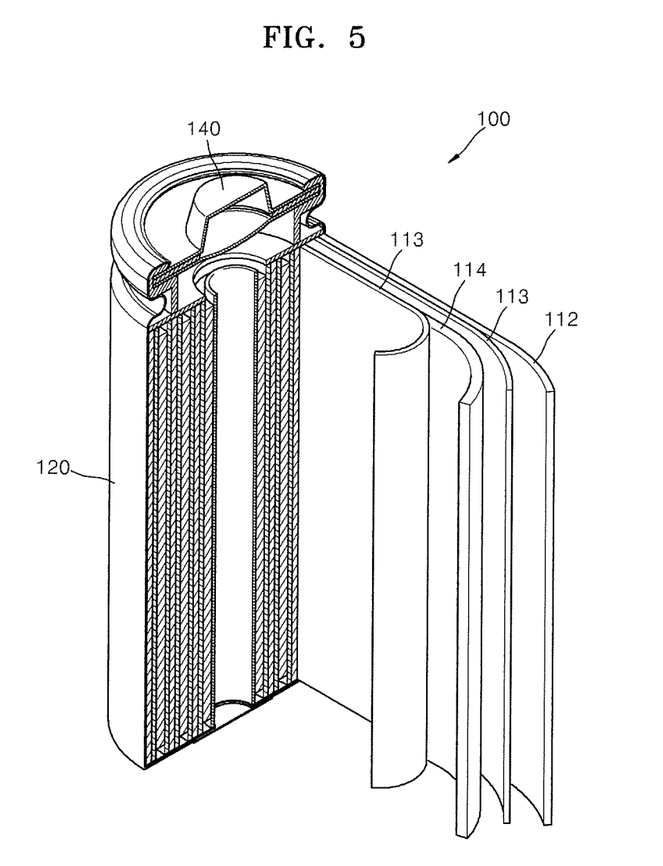
FIG. 5 is an exploded perspective view of a lithium battery according to an embodiment of the present invention.

FIG. 5 is an exploded perspective view of a lithium battery according to an embodiment of the present invention. Referring to FIG. 5, a lithium battery 100 according to the current embodiment includes: a positive electrode 114; a negative electrode 112; a separator 113 between the positive electrode 114 and the negative electrode 112; an electrolyte impregnated into the positive electrode 114, the negative electrode 112, and the separator 113; a battery case 120; and a sealing member 140 sealing the battery case 120. The lithium battery 100 of FIG. 5 may be manufactured by stacking the positive electrode 114, the negative electrode 112, and the separator 113 upon one another, winding the stack in a spiral form, and inserting the wound stack into the battery case 140.

EXAMPLES

Preparation of Super-Conductive Nanoparticle Powder 100 g of expanded graphite was swollen by heat-treatment at 1000° C. for 10 minutes, and gas generated therefrom was discharged via an exhaust outlet of an oven. The resultant was dispersed in ethanol and pulverized using a homogenizer at 10,000 rpm for 10 minutes. The resultant mixture was further pulverized using a micro fluidizer, filtered, washed with ethanol, and dried in an oven at 120° C. to obtain a super-conductive nanoparticle powder.

Figure 8A:
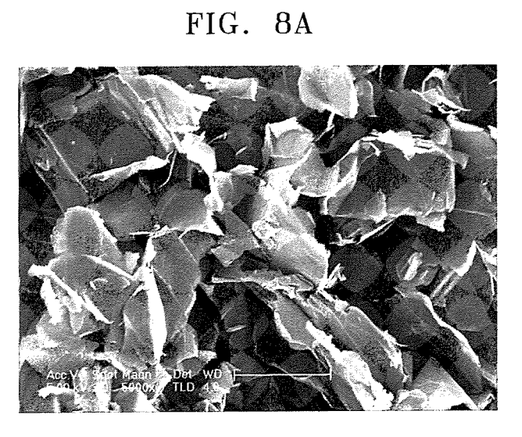
FIG. 8A is a SEM image of super-conductive nanoparticle powder prepared according to Preparation Example 1.

FIG. 8A is a scanning electron microscope (SEM) image of the super-conductive nanoparticle powder. Referring to FIG. 8A, individual super-conductive nanoparticles contained in the super-conductive nanoparticle powder have a substantially planar shape.

Figure 8B:
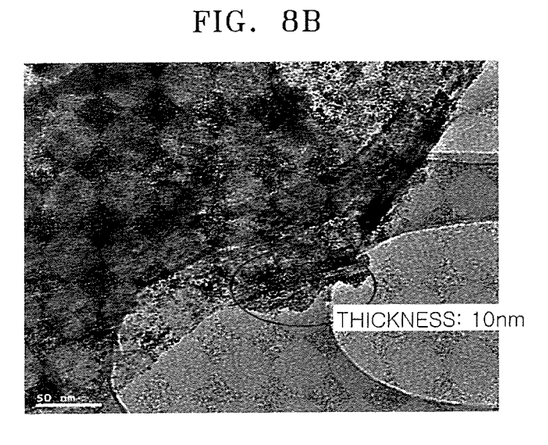
FIG. 8B is a transmission electron microscope (TEM) image of super-conductive nanoparticles prepared according to Preparation Example 1.

FIG. 8B is a transmission electron microscope (TEM) image of super-conductive nanoparticles contained in the super-conductive nanoparticle powder. In FIG. 8B, the red ellipse corresponds to the dotted circle $T_2$ of FIG. 1. The thickness of the super-conductive nanoparticle distinguished by the red ellipse was identified to be about 10 nm. Thus, referring to FIG. 8B, it was identified that the super-conductive nanoparticle prepared as described above had a coordinate c of about 10 nm, wherein c was defined above with reference to FIGS. 1 and 4.

Figure 9:
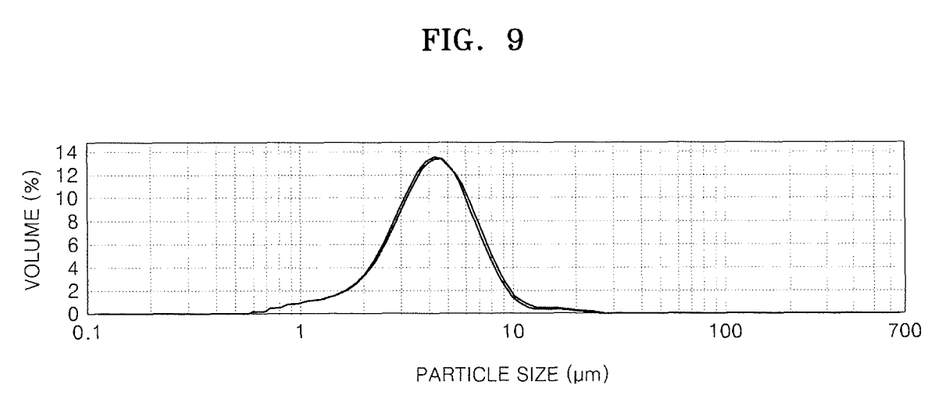
FIG. 9 is a graph illustrating the size distribution of super-conductive nanoparticle powder prepared according to Preparation Example 1.

Also, the size distribution of super-conductive nanoparticles contained in the super-conductive nanoparticle powder was evaluated using a Melvern, Hydro2000, and the results are shown in FIG. 9. Referring to FIG. 9, $d_{10}$, $d_{50}$, and $d_{90}$ of a and b of the super-conductive nanoparticle powder were respectively 2.1 μm, 4.11 μm, and 7.16 μm, wherein a and b are defined above with reference to FIGS. 1 and 4.

Example 1

A Si particle powder having a diameter of about 300 nm, the super-conductive nanoparticle powder, polyvinylidene fluoride as a binder were mixed in N-methylpyrrolidone solvent at a weight ratio of 25:70:5 to prepare a negative electrode active material slurry.

The negative electrode active material slurry was coated on an aluminum (Al)-foil to form a thin plate with a thickness of 90 μm, dried at 135° C. for 3 hours or more, and pressed to have a thickness of 70 μm. The negative electrode plate was punched in a circle with a size of 13ϕ, and the weight thereof was recorded. Then, the negative electrode was processed so as to be suitable for welding, and the weight thereof was recorded. The resultant was welded in a lower portion of a 2016 coin cell and evacuated in a vacuum oven at 250° C. for 5 hours.

PVdF as a binder, NCM(Li(Ni$_{0.5}$Co$_{0.2}$Mn$_{0.3}$)O$_2$) as an active material, and denka black as a conducting agent were mixed in a weight ratio of 5:90:5 using N-methylpyrrolidone solvent to prepare a positive electrode active material slurry.

A positive electrode was prepared using the positive electrode active material slurry in the same manner as in the preparation of the negative electrode.

A lithium battery was prepared using: the negative electrode; the positive electrode; a separator formed of polyethylene and having a thickness of 20 μm; and an electrolyte that is a mixture of ethylene carbonate (EC) and ethylmethyl carbonate (EMC) (EM:EMC=3:7 v/v) and 1.3 M LiPF$_6$).

Comparative Example 1

A lithium battery was prepared in the same manner as in Example 1, except that Si particle powder having a diameter in the range of about 5 to about 10 μm was used instead of Si nanoparticle powder.

Comparative Example 2

A lithium battery was prepared in the same manner as in Example 1, except that graphite (MAG, Hitachi) was used instead of the super-conductive nanoparticle powder.

Evaluation Example

Formation of the lithium batteries prepared according to Example 1 and Comparative Examples 1 and 2 was carried out while maintaining the lithium batteries at room temperature (25° C.) for 20 hours.

The lithium batteries prepared according to Examples 1 and Comparative Examples 1 and 2 were charged with 0.01 V in a constant current (CC)/constant voltage (CV) mode at a rate of 0.2 C (0.01 C cut-off charging) and discharged with 1.1 V at a rate of 0.2 C (1.1 V cut-off discharging). After one cycle of charging and discharging, capacities of the lithium batteries and efficiency of the charging and discharging were evaluated. Then, charging and discharging were repeated 50 times while the charging and discharging rates were fixed at 0.2 C, the capacities of the lithium batteries and efficiency of the charging and discharging were evaluated, and the results are shown in FIGS. 10 and 11.

Figure 10:
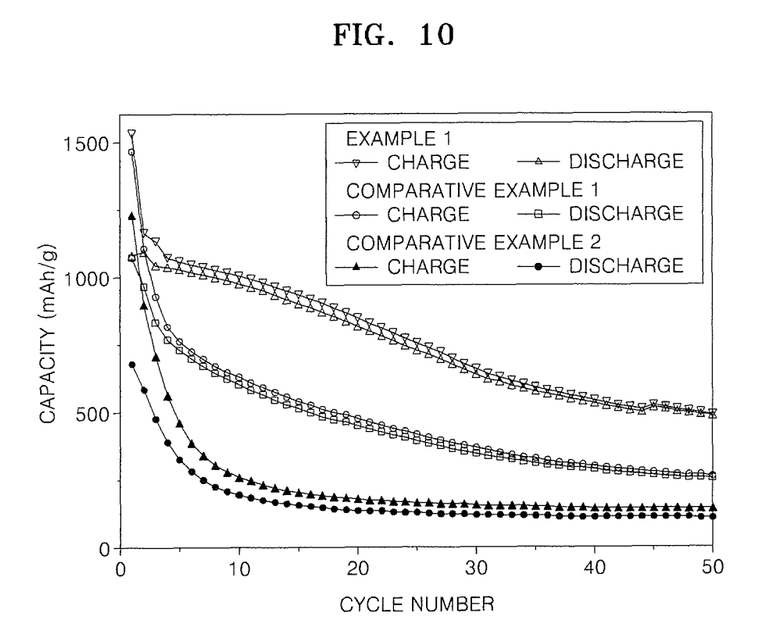
FIG. 10 is a graph illustrating capacity of lithium batteries prepared according to Example 1 and Comparative Examples 1 and 2.

Referring to FIG. 10, the lithium battery prepared according to Example 1 had better cycle lifetime characteristics than the lithium batteries prepared according to Comparative Examples 1 and 2.

Figure 11:
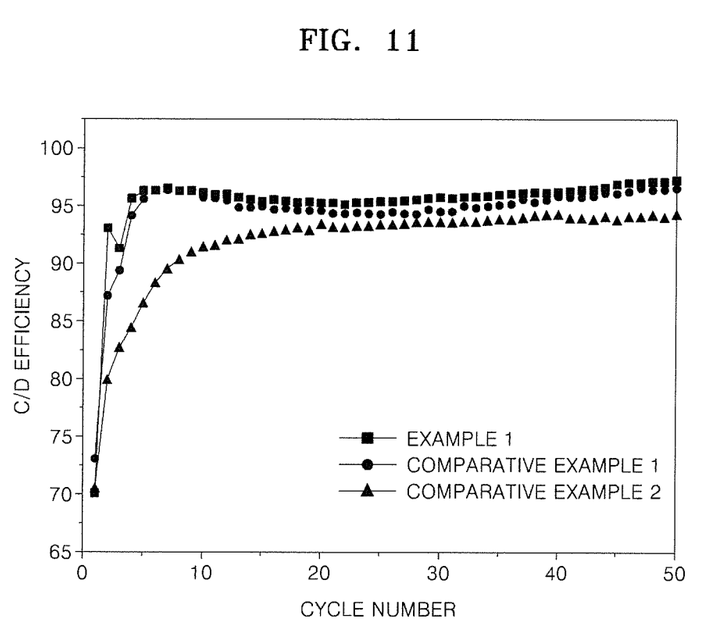
FIG. 11 is a graph illustrating charge/discharge efficiency of lithium batteries prepared according to Example 1 and Comparative Examples 1 and 2.

Referring to FIG. 11, the lithium battery prepared according to Example 1 had better charging and discharging efficiency than the lithium batteries prepared according to Comparative Examples 1 and 2.

As described above, the lithium battery including the nanometal particles and the super-conductive nanoparticles according to the one or more of the above embodiments of the present invention have high capacity and efficiency.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A negative electrode active material comprising nanometal particles and super-conductive nanoparticles,
    each of the nanometal particles having a diameter in a range of about 300 to about 500 nm,
    each of the super-conductive nanoparticles comprising n polycyclic nano-sheets,
    each of the n polycyclic nano-sheets comprising hexagonal rings,
    each of the hexagonal rings comprising 6 interconnected carbon atoms,
    each of the hexagonal rings being fused to at least another one of the hexagonal rings,
    the hexagonal rings of each of the n polycyclic nano-sheets being arranged substantially in a plane,
    the n polycyclic nano-sheets being stacked in a direction normal to the plane,
    n being an integer in the range of 2 to 100, and
    each of the super-conductive nanoparticles having first and second carbon atoms respectively located in the n polycyclic nano-sheets, the first carbon atom being regarded as the origin A (0, 0, 0) of an x, y, z coordinate system and the second carbon atom having a coordinate B (a, b, c), $d_{50}$ of a and b each being independently equal to or less than 10 μm, and $d_{50}$ of c being equal to or less than 100 nm, $L_1$ indicating a distance between the first and second carbon atoms, $L_2$ indicating a distance between a third carbon atom and a fourth carbon atom, and $L_1$ being equal to or greater than $L_2$, the third carbon atom being selected from the carbon atoms of the n polycyclic nano-sheets except for the polycyclic nano-sheets having the first and the second carbon atoms, and the fourth carbon atom being selected from the carbon atoms of the n polycyclic nano-sheets except for the polycyclic nano-sheets having the first, second, and third carbon atoms.

2. The negative electrode active material of claim 1, wherein the nanometal particle comprises a material selected from the group consisting of silicon (Si), tin (Sn), nickel (Ni), and mixtures thereof.

3. The negative electrode active material of claim 1, wherein the adjacent bonded carbon atoms in each of the n polycyclic nano-sheet are bonded to each other by $sp^2$ hybridized bonds.

4. The negative electrode active material of claim 1, wherein each of the n polycyclic nano-sheets has a thickness equal to a diameter of one of the carbon atoms ±1 nm.

5. The negative electrode active material of claim 1, wherein n is an integer in the range of 2 to 10.

6. The negative electrode active material of claim 1, wherein $d_{50}$ of c has a value 50 times as large as the diameter of one of the carbon atoms ±10 nm.

7. The negative electrode active material of claim 1, wherein $d_{50}$ of c has a value in the range of about 0.1 nm to about 50 nm.

8. The negative electrode active material of claim 1, wherein $d_{50}$ of c has a value in the range of about 0.1 nm to about 20 nm.

9. The negative electrode active material of claim 1, wherein the negative electrode active material has a diameter in the range of about 3 μm to about 60 μm.

10. The negative electrode active material of claim 1, wherein the negative electrode active material is pitch-coated.

11. A lithium battery comprising:
    a positive electrode comprising a positive electrode active material;
    a negative electrode comprising a negative electrode active material comprising nanometal particles and super-conductive nanoparticles; and
    an electrolyte,
    each of the nanometal particles having a diameter in a range of about 300 to about 500 nm,
    each of the super-conductive nanoparticles comprising n polycyclic nano-sheets,
    each of the n polycyclic nano-sheets comprising hexagonal rings,
    each of the hexagonal rings comprising 6 interconnected carbon atoms,
    each of the hexagonal rings being fused to at least another one of the hexagonal rings,
    the hexagonal rings of each of the n polycyclic nano-sheets being arranged substantially in a plane,
    the n polycyclic nano-sheets being stacked in a direction normal to the plane,
    n being an integer in the range of 2 to 100, and
    each of the super-conductive nanoparticles having first and second carbon atoms respectively located in the n polycyclic nano-sheets, the first carbon atom being regarded as the origin A (0, 0, 0) of an x, y, z coordinate system and the second carbon atom having a coordinate B (a, b, c), $d_{50}$ of a and b each being independently equal to or less than 10 μm, and $d_{50}$ c being equal to or less than 100 nm, $L_1$ indicating a distance between the first and second carbon atoms, $L_2$ indicating a distance between a third carbon atom and a fourth carbon atom, $L_1$ being equal to or greater than $L_2$, the third carbon atom being selected from the carbon atoms of the n polycyclic nano-sheets except for the polycyclic nano-sheets having the first and the second carbon atoms, and the fourth carbon atom being selected from the carbon atoms of the n polycyclic nano-sheets except for the polycyclic nano-sheets having the first, second, and third carbon atoms.

12. The lithium battery of claim 11, wherein the nanometal particle comprises a material selected from the group consisting of silicon (Si), tin (Sn), nickel (Ni), and mixtures thereof.

13. The lithium battery of claim 11, wherein the adjacent bonded carbon atoms in each of the polycyclic nano-sheets are bonded to each other by $sp^2$ hybridized bonds.

14. The lithium battery of claim 11, wherein each of the n polycyclic nano-sheets has a thickness equal to a diameter of one of the carbon atoms ±1 nm.

15. The lithium battery of claim 11, wherein n is an integer in the range of 2 to 10.

16. The lithium battery of claim 11, wherein $d_{50}$ of c has a value 50 times as large as the diameter of one of the carbon atoms ±10 nm.

17. The lithium battery of claim 11, wherein $d_{50}$ of c has a value in the range of about 0.1 nm to about 50 nm.

18. The lithium battery of claim 11, wherein $d_{50}$ of c has a value in the range of about 0.1 nm to about 20 nm.

19. The lithium battery of claim 11, wherein the negative electrode active material has a diameter in the range of about 3 μm to about 60 μm.

20. The lithium battery of claim 11, wherein the negative electrode active material is pitch-coated.

* * * * *